L. M. WOOLSON.
HYDROCARBON MOTOR.
APPLICATION FILED FEB. 7, 1920.
1,415,080.
Patented May 9, 1922.
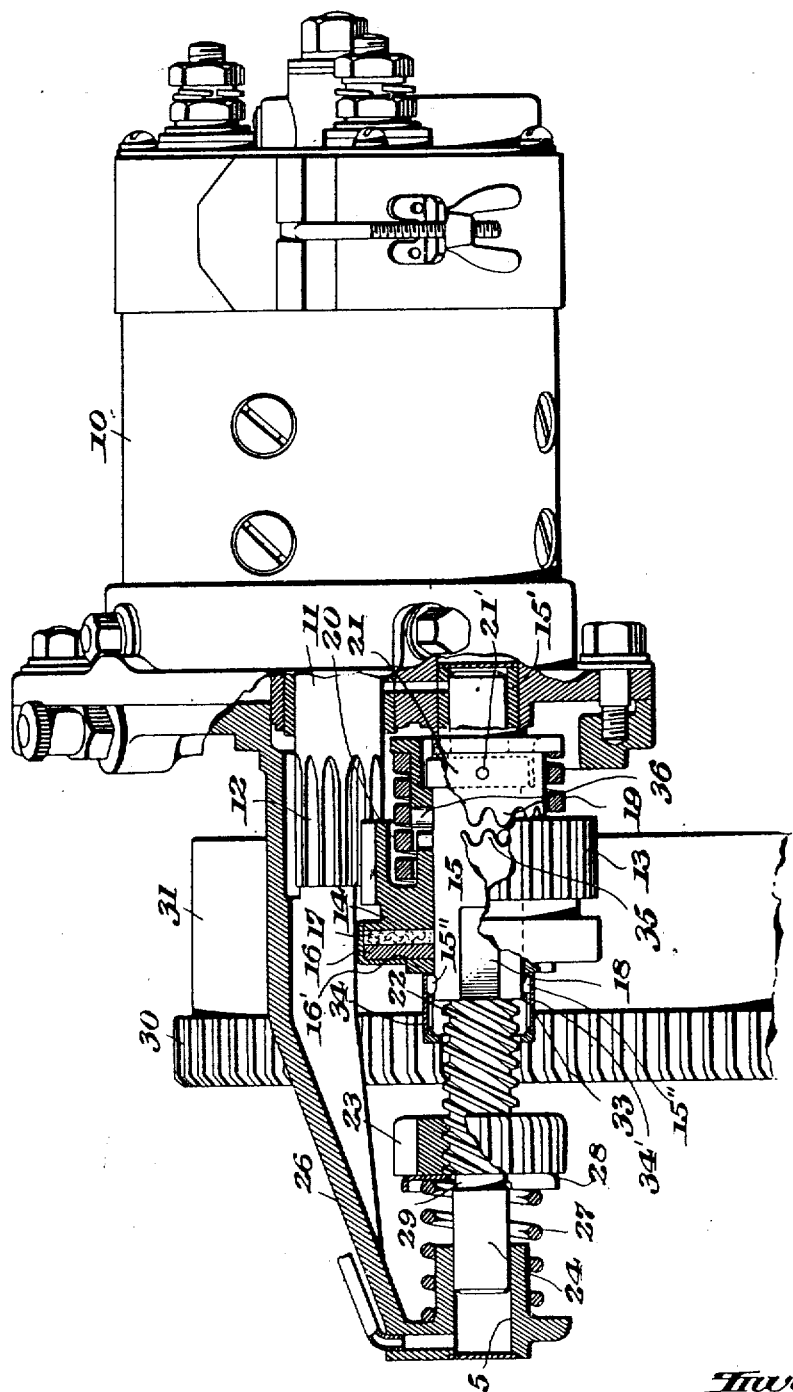
Inventor,
Lionel M. Woolson,
By Nelson Sibbetts
Atty.

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

1,415,080.  Specification of Letters Patent.  Patented May 9, 1922.

Application filed February 7, 1920. Serial No. 357,033.

*To all whom it may concern:*

Be it known that I, LIONEL M. WOOLSON, a citizen of the United States, and resident of Detroit, Wayne county, State of Michigan, have invented certain new and useful Improvements in Hydrocarbon Motors, of which the following is a specification.

This invention relates to hydrocarbon motors and more particularly to starting mechanism therefor.

One type of starter for hydrocarbon motors now in common use utilizes an electric motor as a source of power and driving connections are provided between the electric motor and the hydrocarbon motor for turning over the fly wheel and starting the hydrocarbon motor. In order to start the hydrocarbon motor in this manner it is desirable to provide means in the driving connections between the two motors for building up the torque in the electric motor before connecting the driving member and the motor to be driven therefrom. One method of accomplishing this end utilizes frictionally engaging clutch members, the connection being such that these clutch members will be gradually forced into more intimate engagement with each other until sufficient torque has been developed to start the hydrocarbon motor, whereupon the connections will be completed and the motor started.

It has been found in devices of this character that under certain conditions, such for instance, as when the motor is cold and consequently hard to start, or when the clutch faces become glazed or oil gains access to the clutch faces, the clutch slips and fails to operate to start the hydrocarbon motor.

The object of the present invention, therefore, is to overcome this difficulty and to provide starting mechanism having an additional and positive means for connecting the starting motor to the hydrocarbon motor.

Another object of the invention is to provide driving connections between the starting motor and the hydrocarbon motor so constructed and arranged that a positive connection will be automatically made between the two motors after sufficient torque has been developed to start the hydrocarbon motor.

Further objects of the invention will appear from the following description taken in connection with the drawings in which I have shown an elevational view partly in section illustrating the improved driving connections between the starting motor and the fly wheel of the hydrocarbon motor.

The specific details of construction of the starting motor have not been illustrated, since, per se, they form no part of the present invention, but this motor is represented in a general way by a casing 10, and an armature shaft 11 extending outwardly from the casing and having formed thereon or secured thereto a pinion 12 which meshes with a pinion 13 secured to or formed integral with a clutch member 14, the latter being rotatably supported on a shaft 15. Shaft 15 is journaled at one end in a bearing 15' and at its other end in a bearing 25, hereinafter more fully described. The clutch member 14 is rotatable upon and slidable relatively to the shaft 15 and is frictionally connected to the clutch member 16 through the medium of a friction washer 17 formed of cork, leather, or other suitable material. The clutch member 16 is provided on its inner periphery with a flat surface which enages a flat surface 18 formed on the shaft 15 thereby positively but slidably connecting the member 16 with the shaft 15.

Means is provided for normally forcing the clutch members 14 and 16 to the left, this means comprising a relatively stiff coil spring 19 which is seated in the recess 20 formed in the clutch member 14 and at its opposite end engages a flanged collar 21 which is positively secured to the shaft 15 as by a pin 21', or the member 21 may be integral with the shaft if desired. This movement of the members 14 and 16 toward the left is limited by pins 15" carried by the shaft 15 and which are adapted to be engaged by a collar 16' slidably carried by the shaft 15. The shaft 15 is extended in the form of a worm or screw thread upon which is loosely threaded a pinion 23, the end of the extension 22 being cylindrical as shown at 24 and slidably engaging a journal 25 formed in the casting 26 which supports the driving connections just described. A spring 27 engages a flanged collar 28 which rests against a shoulder 29 formed at the end of the worm 22 of the shaft 15 and this flanged collar with the spring forms an abutment for the pinion 23 above referred to. It will be evident also that the spring 27 normally maintains the shaft 15 in the position shown in the drawings and that this spring permits longitudinal movement of the shaft toward the left in case the pinion 23 fails to properly mesh with a gear 30 formed on or secured to the fly wheel 31 of the hydrocarbon motor.

A sleeve 34 is slidably mounted on the shaft 15 and engages at one end the collar 16' and the sleeve is adapted to be engaged by the pinion 23, this engagement causing the sleeve 34, collar 16' and clutch members 16 and 14 to be moved toward the right against the tension of the spring 19. Channels 34' are provided in the sleeve and receive the pins 15 by means of which the sleeve is guided in its sliding movement.

The driving connection just described operates in the following manner: When the starting motor is energized the armature shaft 11 and pinion 12 are rotated, thereby rotating the pinion 13, clutch members 14 and 16, and shaft 15 and its extension 22. Because of the high rotational speed of the shaft, the relatively loose threaded connection between the pinion 23 and the threaded extension 22 and of the inertia of the pinion 23, the rotation causes a movement of the pinion 23 longitudinally on the extension 22 and as the pinion moves in this manner it engages the sleeve 34. The continued movement of the pinion after thus engaging the sleeve 34 causes a joint movement of the clutch members 16 and 14, forcing these members against the tension of the spring 19 into more intimate engagement with each other and thereby gradually building up the torque.

The above description is based on the assumption that the pinion teeth mesh properly with the gear teeth when the pinion has moved into meshing position, but if the teeth are not so relatively disposed the rotation of the pinion on the worm will be prevented and the worm will thread itself into the pinion moving the shaft 15 and worm extension 22 to the left (viewing the structure as illustrated). When the pinion and gear snap into mesh the reverse movement takes place and the pinion again moves endwise on the worm extension 22 of the shaft 15.

In previous constructions, no further driving connections between the starting motor and the hydrocarbon motor fly wheel are provided, the pinion 23 engaging the gear 30 carried by the fly wheel after the pinion has traveled a sufficient distance to build up the torque and to cause intimate engagement between the clutch members 14 and 16.

However, as above stated in the specification, it sometimes happens that the motor is cold, the faces of the clutch members become glazed or that oil gains access to the clutch faces and when one of these conditions arises sufficient torque will not be built up to start the hydrocarbon motor.

In order to overcome this defect I have provided in addition to the frictional or yielding driving connection between the clutch members a positive driving connection between the clutch member 14 and the driven shaft 15.

This additional positive driving connection comprises clutch teeth 35 formed on the clutch member 14 and corresponding teeth 36 formed on the flanged collar 21. With this construction it will be evident that when sufficient torque has been built up, on the driven shaft, to start the hydrocarbon motor the teeth 35 on the clutch member 14 will engage the depressions between the teeth 36 on the collar 21 and thereby positively connect the clutch member 14 to the driven shaft 15. The driving connections will then be made through the pinion 12, gear 13, clutch member 14, flanged collar 21, shaft 15, pinion 23 and gear 30, whereas in the previous constructions the driving connections were made through the pinion 12, gear 13, clutch member 14, clutch member 16, shaft 15, pinion 23 and gear 30.

From the above description it will be evident that means has been provided for positively connecting the starting motor with the motor to be started after sufficient torque has been built up on the driven shaft to turn over the fly wheel and start the hydrocarbon motor.

Although I have in the above specification specifically described one form of driving connections between the starting motor and the motor to be started, it will be understood that changes and modifications may be made in these connections without departing from the spirit or scope of the invention as expressed in the following claims.

What I claim and desire to secure by Letters Patent is:

1. Starting mechanism comprising a drive shaft, a driven shaft, a source of power connected to said drive shaft, connecting means between said shafts adapted to build up the torque on the driven shaft, and means for positively connecting said shafts when the torque has been built up to a predetermined degree.

2. Starting mechanism comprising a drive shaft, a driven shaft, a source of power connected to said drive shaft, connecting means, including a friction clutch, between said shafts adapted to build up the torque on the driven shaft, and means for positively connecting said shafts when the torque has been built up to a predetermined degree.

3. Starting mechanism comprising a drive shaft, a driven shaft, a source of power connected to said drive shaft, means, including a plurality of clutch members held in engagement with each other, for building up the torque on the driven shaft, and means for positively connecting said shafts when the torque has been built up to a predetermined degree.

4. Starting mechanism comprising a drive shaft, a driven shaft, a source of power connected to said drive shaft, means for connecting said shafts, including friction clutch members yieldingly held in engagement with each other, means for forcing said members into engagement with each other against the tension of said yielding means, and means for positively connecting said shafts when said clutch members have been forced into engagement with each other to a sufficient extent to build up the torque on the driven shaft to a predetermined degree.

5. Starting mechanism comprising a clutch member, a drive shaft operatively connected thereto, a second clutch member adapted to be yieldingly engaged by said first clutch member, a driven shaft connected to said second clutch member, and means dependent upon the torque built up in the driven shaft for positively connecting said first clutch member to said driven shaft.

6. Starting mechanism comprising a drive shaft, a clutch member operatively connected thereto, a second clutch member, means for forcing said clutch members into frictional engagement with each other, a driven shaft connected to said second clutch member, and means for connecting said first clutch member to said driven shaft upon predetermined torque being built up through the clutch members.

7. Starting mechanism comprising a drive shaft, a driven shaft, means, including clutch members, for connecting said shafts, a resilient abutment for said clutch members, means for moving said members into engagement with each other against the tension of said resilient abutment, and means for positively connecting one of said clutch members to said driven shaft after predetermined torque has been built up.

8. Starting mechanism comprising a drive shaft, a driven shaft, a clutch member carried by said driven shaft and slidable thereon, a second clutch member adapted to engage said first clutch member and slidable on but splined to said driven shaft, means for rotating said first named clutch member, and means for positively connecting said first named clutch member with said driven shaft upon predetermined torque being built up through the clutch members.

9. Starting mechanism comprising a drive shaft, a driven shaft, friction clutch members adapted to connect said drive shaft to said driven shaft, means carried by said driven shaft adapted to be connected to a rotatable part of a hydrocarbon motor and movable longitudinally on said shaft, means carried by said clutch members and adapted to be engaged by said last named means in its longitudinal movement on the driven shaft whereby the clutch members will be moved with said means, and a member engageable with one of said clutch members upon a predetermined movement thereof and connected to said driven shaft.

10. Starting mechanism comprising in combination a drive shaft, a driven shaft, a clutch member slidable and rotatable upon said driven shaft and operatively connected to said drive shaft, a second clutch member adapted to be engaged by said first named member and positively connected to said driven shaft, resilient means for forcing said clutch members in one direction on said driven shaft, a third clutch member positively connected to said driven shaft and adapted to be engaged by said first named clutch member, and means for moving said second named clutch member upon said driven shaft against the tension of said resilient means to a position wherein said first and third named clutch members will positively engage each other.

11. Starting mechanism comprising a drive shaft, a driven shaft, friction clutch members carried by said driven shaft, one of said members being driven from said drive shaft and the other member being splined to said driven shaft, said driven shaft being provided with a screw threaded extension, a pinion carried by said screw threaded extension and adapted to move longitudinally of said extension into a position to force said clutch members longitudinally of said driven shaft, and means connected to said driven shaft and adapted to be engaged by one of said clutch members upon predetermined movement of said clutch members by said pinion.

12. Starting mechanism comprising two friction clutch members, a shaft connected to be turned by one of said clutch members, a source of power connected to positively drive the other of said clutch members, and means for connecting said other clutch member positively to said shaft when the torque has been built up to a predetermined degree.

13. Starting mechanism comprising two friction clutch members, a shaft connected to be turned by one of said clutch members, a motor geared to the other of said clutch members, and means for positively clutching said other clutch member to said shaft as the torque is built up to a certain degree.

14. The combination with a gear on a hydrocarbon engine, and a starting motor, of a starting shaft having a threaded portion, a pinion on said threaded portion and adapted to move thereon into and out of engagement with said gear, a friction clutch, a positive clutch, and means for operating both said clutches by the movement of said pinion.

15. The combination with a gear on a hydrocarbon engine, and a starting motor, of a starting shaft having a threaded portion, a pinion on said threaded portion and adapted to move thereon into and out of engagement with said gear, a friction clutch, a positive clutch, and means for increasing the frictional engagement of the friction clutch and for engaging the positive clutch by the movement of said pinion.

16. The combination with a gear on a hydrocarbon engine, and a starting motor, of a starting shaft having a threaded portion, a pinion on said threaded portion and adapted to move thereon into and out of engagement with said gear, a friction clutch connected to be operated by said motor and adapted to turn said shaft to move the pinion lengthwise thereof, a positive clutch, and means tending to increase the pressure on the friction clutch and then to engage the positive clutch as the pinion moves lengthwise of the shaft.

In testimony whereof I affix my signature.

LIONEL M. WOOLSON.